United States Patent
Nunez Delgado et al.

(10) Patent No.: US 7,959,753 B2
(45) Date of Patent: Jun. 14, 2011

(54) PROCESS OF MANUFACTURING COMPOSITE PANELS WITH U-SHAPED STIFFENING MEMBERS

(75) Inventors: Julio Nunez Delgado, Madrid (ES); Augusto Perez Pastor, Madrid (ES); Gabriel Cruzado Parla, Madrid (ES)

(73) Assignee: Airbus Espana, S. L., Getafe, Madrid (ES)

( * ) Notice: Subject to any disclaimer, the term of this patent is extended or adjusted under 35 U.S.C. 154(b) by 764 days.

(21) Appl. No.: 11/364,494

(22) Filed: Feb. 28, 2006

(65) Prior Publication Data

US 2007/0175171 A1 Aug. 2, 2007

(30) Foreign Application Priority Data

Dec. 30, 2005 (WO) ................. PCT/ES2005/070189

(51) Int. Cl.
*B32B 37/10* (2006.01)
*B29C 70/34* (2006.01)
*B29C 70/44* (2006.01)
*B29C 70/68* (2006.01)

(52) U.S. Cl. .......................... 156/245; 156/285; 156/289

(58) Field of Classification Search ................... 156/196, 156/245, 285, 286, 289
See application file for complete search history.

(56) References Cited

U.S. PATENT DOCUMENTS

| | | | | |
|---|---|---|---|---|
| 4,783,362 A | * | 11/1988 | Thornton et al. | 442/203 |
| 4,946,526 A | * | 8/1990 | Petty-Galis et al. | 156/155 |
| 5,015,168 A | * | 5/1991 | Boime et al. | 425/389 |
| 5,116,216 A | * | 5/1992 | Cochran et al. | 425/504 |
| 5,129,813 A | * | 7/1992 | Shepherd | 425/504 |
| 5,593,633 A | * | 1/1997 | Dull et al. | 264/510 |
| 5,882,462 A | * | 3/1999 | Donecker et al. | 156/205 |
| 6,355,133 B1 | * | 3/2002 | Williams | 156/296 |
| 6,565,690 B1 | * | 5/2003 | Cerezo Pancorbo et al. | 156/196 |
| 2002/0027187 A1 | * | 3/2002 | Sato et al. | 249/187.1 |
| 2005/0166501 A1 | * | 8/2005 | Navas et al. | 52/309.13 |

* cited by examiner

*Primary Examiner* — Michael A Tolin
(74) *Attorney, Agent, or Firm* — Ladas & Parry LLP

(57) ABSTRACT

The present invention relates to a process for manufacturing panels (9) for aeronautical structures with U-shaped stiffening members (13) and I-shaped stiffening members (17) between their webs comprising the following steps: providing laminates for shaping the skin (11) on the curing tool (31); providing planar laminates (23) for shaping the stiffening members (13, 17); shaping the U-shaped stiffening members (13) on individual shaping tools (33) and placing the I-shaped stiffening elements (17) in said tools; grouping said individual shaping tools (33) together on an assembly tool (41); placing the group of stiffening members (13, 17) on the skin (11); placing a vacuum bag (55) on the assembly with the aid of profiles (59); consolidating said assembly by means of a curing process under suitable pressure and temperature conditions using external tools (60) to assure verticality of the webs of the stiffening members (13, 17).

6 Claims, 4 Drawing Sheets

PROCESS OF MANUFACTURING COMPOSITE PANELS WITH U-SHAPED STIFFENING MEMBERS

FIELD OF THE INVENTION

The present invention relates to a process for the manufacture of composite panels with U-shaped stiffening members, and particularly to panels with this configuration intended for aeronautical structures.

BACKGROUND OF THE INVENTION

It is common to use panels containing stiffening members in the pieces forming part of a structure. Among the various processes for obtaining increased panel stiffness is the attachment of profiles thereto, such that the desired increased stiffness is obtained.

There are also various manners of attaching the profiles to the panel (by means of rivets, using adhesives . . . ). Different manufacturing costs and different performances of the structure in its working medium will be obtained according to how this is done.

In panels made with composites, a very advantageous process for obtaining a stiffening panel is the integration of the manufacture of the panel and the stiffener, such that when the resin is cured the two elements remain attached to one another. This process of manufacturing by means of integrating the two members is called cocuring. From an industrial point of view, the advantage of a cocured join in comparison with rivet-type join is that no subsequent machining and rivet installation operations are required in order to carry out the join. In comparison with joins using adhesive bonds, the cocured join has more significant advantages: less weight in the structure, reduced number of curing cycles and finally, no need to use surface preparation methods to carry out the join.

Different types of processes and tools are known in the prior art for carrying out cocuring. The use of stiff tools (made of carbon fiber or metal) and elastomeric-type tools, placed inside the vacuum bag, the autoclave pressure subsequently acting on the piece through them, is particularly known.

The present invention has as an object providing an effective process for manufacturing a panel with stiffening members with a cocured join of the skin and stiffening members.

SUMMARY OF THE INVENTION

The present invention proposes a process for manufacturing panels for aeronautical structures with U-shaped stiffening members and I-shaped stiffening members (i.e. stiffening members of rectangular cross section) between their webs comprising the following steps:

a) Providing a preimpregnated composite laminate for shaping the skin of the panel on the curing tool;

b) Providing planar preimpregnated composite laminates for shaping the U-shaped stiffening members and I-shaped stiffening members, respectively;

c) Shaping the U-shaped stiffening members from the planar laminates on individual shaping tools and placing I-shaped stiffening elements in the housings provided in said tools;

d) Grouping said individual shaping tools together on an assembly tool;

e) Placing the assembly of stiffening members on the skin, turning the assembly tool 180° and positioning it thereon;

f) Removing the tool once the stiffening members have been joined to the skin;

g) Placing a vacuum bag on the panel fitting it as much as possible to the contour of the stiffening members;

h) Consolidating the panel by means of a curing process under suitable pressure and temperature conditions using external tools to assure verticality of the webs of the U-shaped stiffening members and the I-shaped stiffening members located between their webs.

An important feature of the process object of the present invention is that panels stiffened with U-shaped profiles are obtained from composite laminates in a single curing cycle in which the autoclave pressure acts directly on the panel given that the tools used are located outside the vacuum bag.

The process is particularly applicable to composite laminates, particularly of the preimpregnated tape type whose stacking sequence has been done using an automatic taping machine.

Other features and advantages of the present invention shall be gathered from the following detailed description of an illustrative embodiment of its object in relation to the attached drawings.

DETAILED DESCRIPTION OF THE INVENTION

Figure 1:
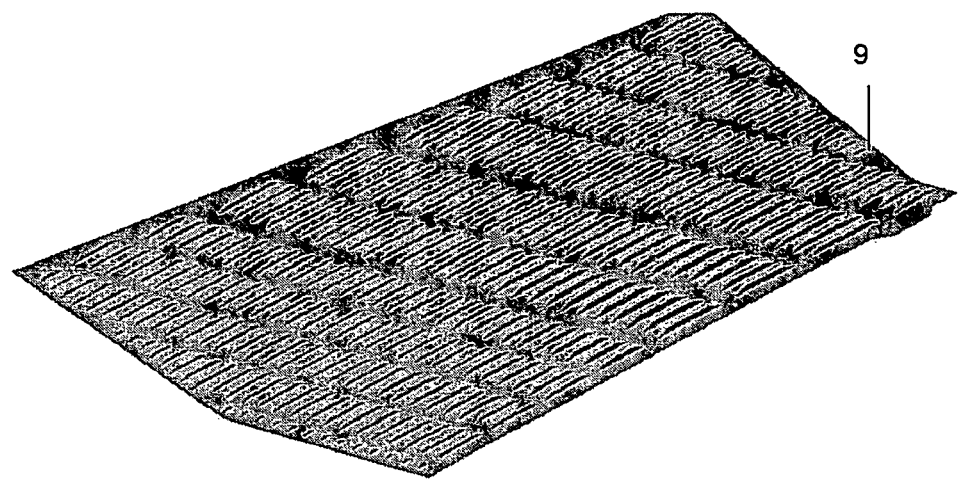
FIG. 1 shows a panel stiffened with the U-shaped profiles.
Figure 2:
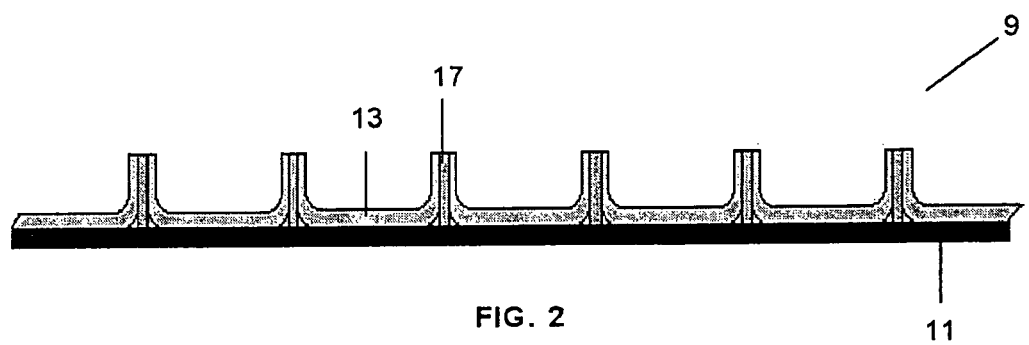
FIG. 2 shows a schematic cross-section view of the panel of FIG. 1.
Figure 3:
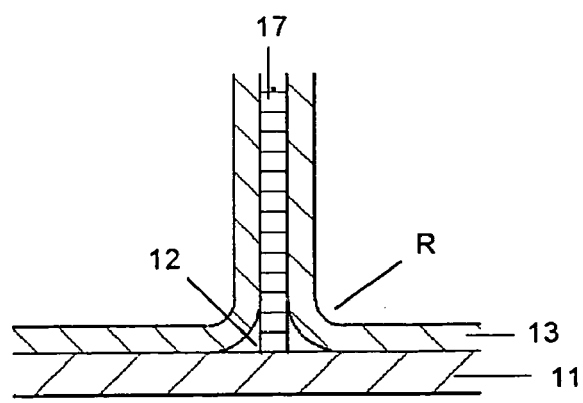
FIG. 3 shows a detailed view of an area of the panel with its components.
Figure 4:
FIG. 4 schematically shows the starting laminates for obtaining the stiffening members according to the process object of the present invention.

The process object of the present invention described below has the purpose of manufacturing a structural panel 9 stiffened with U-shaped profiles that is formed by a skin 11, U-shaped stiffening members 13 and I-shaped stiffening members 17 arranged between the webs of the U-shaped members.

Provided first on one hand is the laminating of the skin 11, obtained by automatic taping, on the assembly curing tool 31, and on the other hand laminates 23 required for shaping the stiffeners are provided, obtained by making a controlled number of cuts on a laminate made by automatic taping.

The laminates 23 are cut, taking into account that the U-shaped stiffening members 13 are not continuous along the entire piece, since they disappear in the transverse crossings where the ribs are located, so in these areas the laminate does not have to be folded to form the webs of the U-shaped members.

The laminates 23 are provided with a layer of dry peel-ply fabric 29 on its inner side which is cut at the same time as the laminates 23. This layer 29 accompanies each laminate 23 until the end of the curing step and, when removed, provides the final finishing of the piece.

Figure 5A:
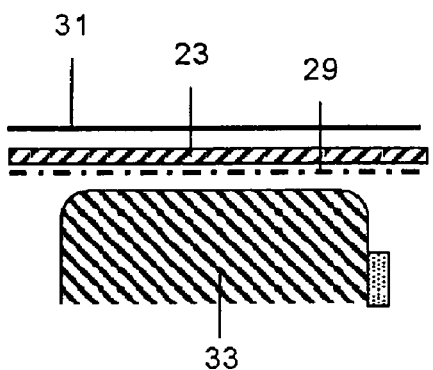
FIGS. 5a and 5b schematically show the elements involved in the panel stiffening member shaping process according to the process object of the present invention.
Figure 5B:
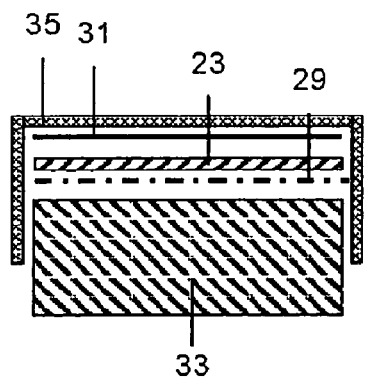
Figure 6:
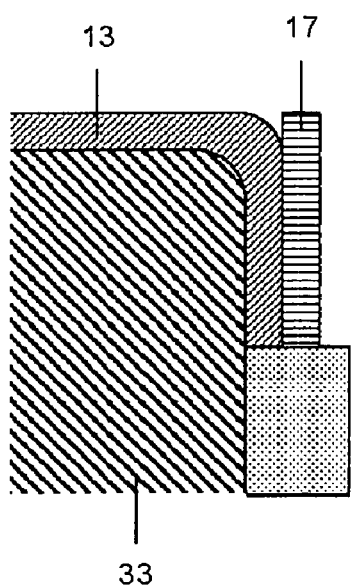
FIG. 6 shows a detailed view of the shaping of a stiffening member on an individual shaping tool.
Figure 7A:
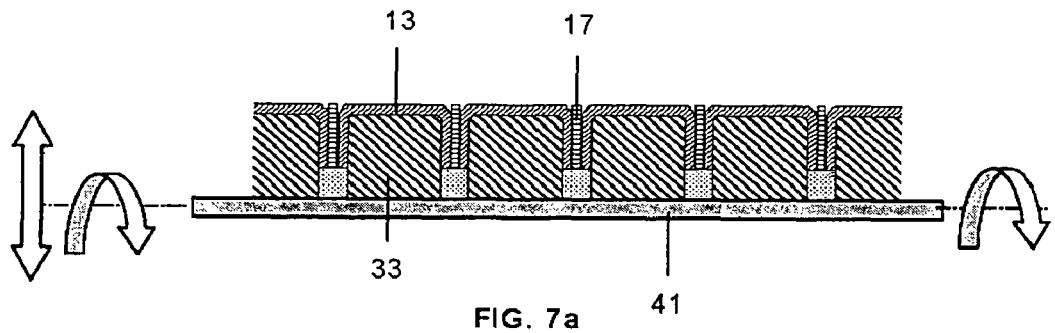
FIGS. 7a, 7b and 7c schematically show the process of shaping the panel from its components.
Figure 7B:
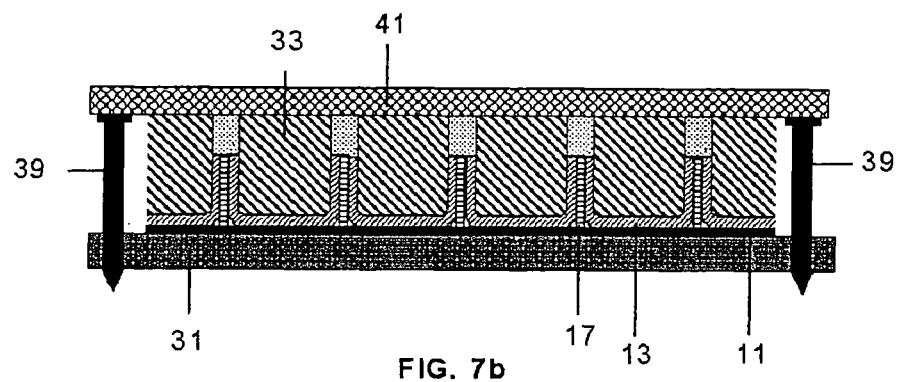
Figure 7C:
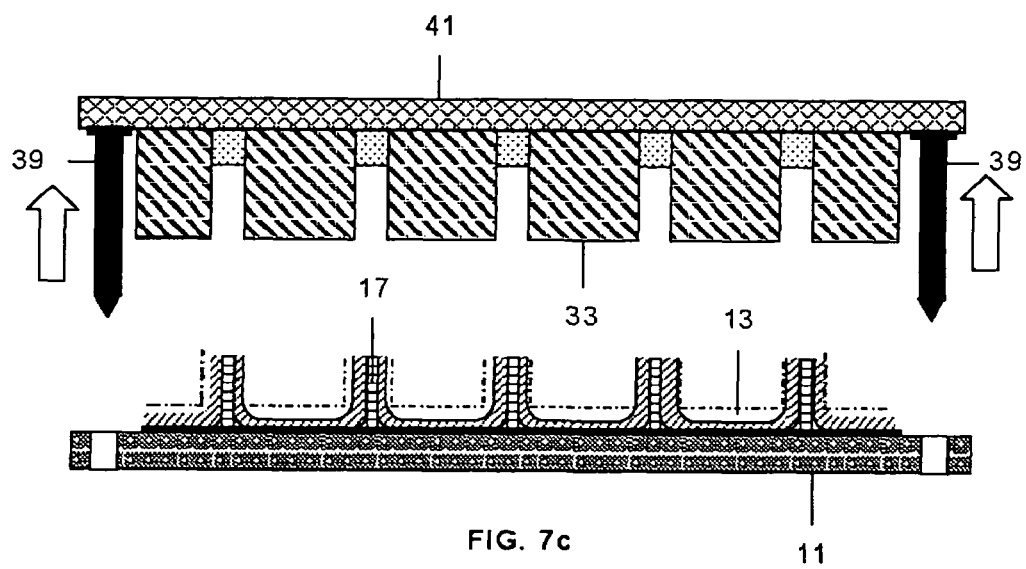
Figure 8:
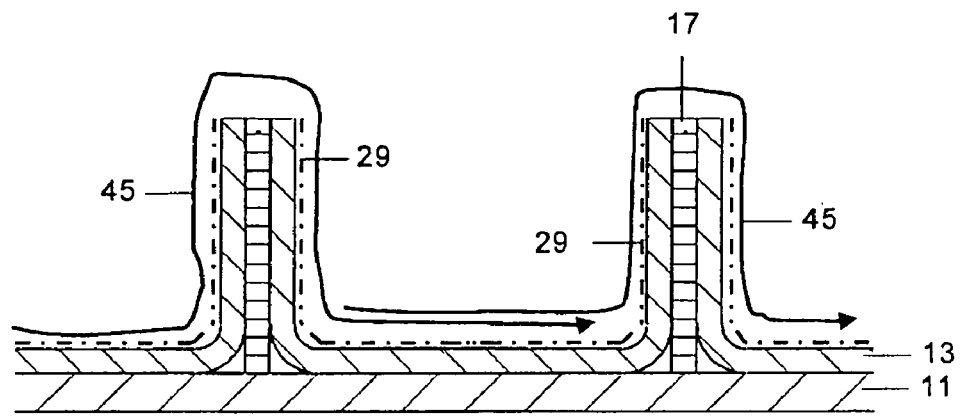
FIG. 8 shows the different members of the panel before curing.
Figure 9:
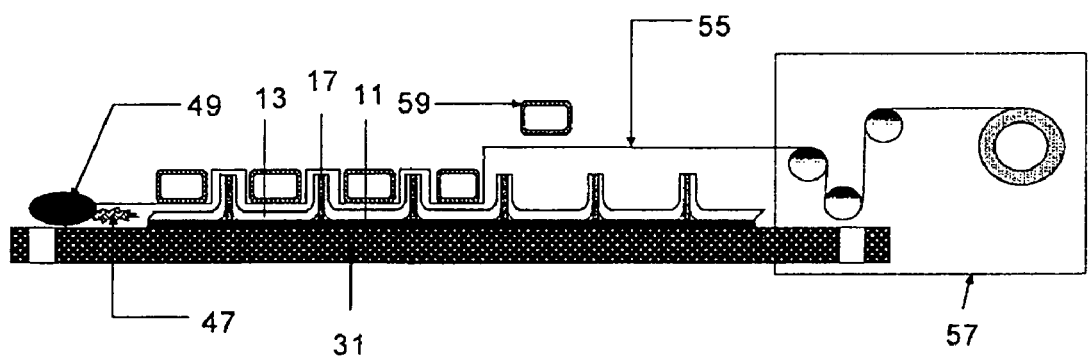
FIG. 9 schematically shows the placement of the vacuum bag.
Figure 10:
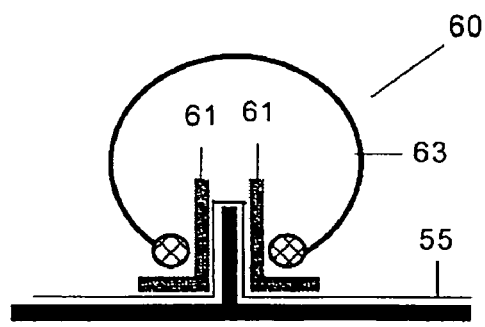
FIG. 10 schematically shows the external tool used during curing.

The laminate 23 is placed on the shaping tool 33, the surface of which copies by means of machining the surface and/or recesses the base laminate 11 may have so that there is perfect coupling between them. The placement on the shaping tool 33 provides the laminate 23 itself. A deformable non-adhesive film 31 is placed on the laminate 23 and pieces are placed by way of a clamp 35 in the areas where the laminate does not have to be bent so as to prevent any movement thereof (FIG. 5b).

The laminate 23 bends in the desired areas by means of an impermeable elastic membrane (not shown) under the action of heat and the vacuum.

Once the step for shaping the U-shaped stiffening members 13 has concluded the laminates of the I-shaped stiffening members 17, which were previously taped automatically and cut in numerical control machines, are placed in the housings arranged for that purpose.

The individual shaping tools 33 are then grouped together to form the group of stiffening members 13, 17 by means of a tool 41 on which the shaping tools 33 slide and the laminates will form the stiffening members 13, 17.

The tool 41 is provided with means allowing it, on one hand, up and down movements, and on the other hand rotation about a horizontal axis. By means of a 180° turn, stiffening members 13 that occupied the position of an inverted U in the shaping step occupy the final curing position. The tool 41 is made to lower upon the assembly curing tool 31 on which the base laminate 11 has been made. Both tools 41, 31 are coordinated by means of centering means 39 so that in the lowering the stiffening members 13, 17 occupy their final position on the skin 11.

They remain in this position for some time until the laminates of the base skin 11 and of the stiffening members 13, 17 are attached to one another. Then the shaped stiffening members 13, 17 are released from their respective tools 33, raising tool 41, the layer of peel-ply fabric 29 being visible.

Then the final vacuum bag 55 is carried out on the assembly of the skin 11 and stiffening members 13, 17.

To that end a non-porous separating film 45 is first arranged on the stiffening members 13, 17 in the manner of a hood which has previously been cut into strips of suitable width, such that it covers 90% of the laminate between every two stiffening members so as to prevent the resin from the laminate from damaging the vacuum bag 55.

The remaining material forming the vacuum bag is then arranged: dry glass fiber strips 47 on the contour, vacuum sealing 49 for the bag and the bag 55 itself. In this manufacturing process it is essential that the vacuum bag be fitted as much as possible to the manufactured piece and that the material be distributed equally on both sides of each stiffening member, so in order to arrange the film of the vacuum bag a rotating roller system 57 is used, homogenizing the stress in the bag 55, and a group of profiles 59 holding the bag 55 already arranged in place so that no material is dragged.

Once the vacuum bag is closed on all sides the vacuum is applied, without having removed the profiles 58 from on top of the assembly, so that the vertical webs of the U-shaped members do not bend.

Additional tools 60 are used for curing the assembly which are adjusted to the webs of the stiffening members 13, 17 during all the phases of the resin polymerization cycle. In other words, these tools act on the webs of the stiffening members 13, 17, whatever the curing pressure and temperature may be. These additional tools 60 replace the profiles 59 used for arranging the vacuum bag 55 and in a preferred embodiment they are formed by a pair of angle irons 61 and springs 63 distributed along the length of the strengthening members. The angle irons 61 tighten around the webs of the stiffening members 13, 17, on top of the vacuum bag 55, due to the action of the spring 63, and therefore the verticality of the members during the curing cycle is assured. Curing with a direct vacuum bag 55 assures good compacting and/or quality of the obtained laminates.

The manufacturing process is limited to U-shaped stiffening members 13 of a total lower web thickness of 2.5 mm so that the bending radius R is of the same order of magnitude and therefore the cavities 12 are so small that they do not require a special filler piece.

For thicker U-shaped stiffening members 13 the I-shaped reinforcement member 17 would have to be shorter, reaching the tangent of the bending radius, and additional material would have to be used so as to cover the cavities 12.

Any modifications comprised within the scope defined by the following claims can be introduced in the preferred embodiment described above.

The invention claimed is:

1. A process for manufacturing panels (9) for aeronautical structures with U-shaped stiffening members (13) and I-shaped stiffening members (17) between their webs, comprising:
   a) providing a curing tool (31) and a pre-impregnated composite laminate for shaping the skin (11) of the panel (9) on the curing tool (31);
   b) providing planar pre-impregnated composite laminates (23) for shaping the U-shaped stiffening members (13) and the I-shaped stiffening members (17), respectively;
   c) shaping the U-shaped stiffening members (13) from the planar laminates (23) on individual shaping tools (33) and placing the I-shaped stiffening elements (17) in housings provided in said tools (33), each housing comprising a space between adjacent tools;
   d) grouping said individual shaping tools (33) together on an assembly tool (41);
   e) placing a group of stiffening members (13, 17) on the skin (11), turning the assembly tool (41) 180°, and positioning the assembly tool (41) upon the group of stiffening members (13, 17);
   f) removing the assembly tool (41) once the stiffening members (13, 17) have been joined to the skin (11);
   g) placing a vacuum bag (55) on the assembly of the skin (11) and stiffening members (13, 17), fitting the vacuum bag (55) as much as possible to the contour of the stiffening members by means of profiles (59); and
   h) consolidating said assembly by a curing process under suitable pressure and temperature conditions using external tools (60) located outside the vacuum bag (55) to assure verticality of the webs of the stiffening members (13, 17),
   wherein the external tools (60) used in step h) comprise a pair of profiles (61) and springs (63), the profiles (61) tightening around the webs of the stiffening members (13, 17) on top of the vacuum bag (55) by the pressure of the springs (63), and
   wherein step b) includes providing the laminates (23) for shaping the U-shaped stiffening members (13) with a layer of dry peel-ply fabric (29) on a lower side of the laminates (23) before said turning of the assembly tool (41) in step e).

2. The process for manufacturing panels (9) for aeronautical structures with U-shaped stiffening members (13) and I-shaped stiffening members (17) between their webs according to claim 1, wherein step f) includes arranging a non-porous separating film on the U-shaped stiffening members (13) to prevent their resin from damaging the vacuum bag (55).

3. The process for manufacturing panels (9) for aeronautical structures with U-shaped stiffening members (13) and I-shaped stiffening members (17) between their webs according to claim 2, wherein the thickness of the U-shaped stiffening members (13) is less than 2.5 mm.

4. A process for manufacturing panels (9) for aeronautical structures with U-shaped stiffening members (13) and I-shaped stiffening members (17) between webs according to claim 2, characterized in that the thickness of the U-shaped stiffening member (13) is equal to or greater than 2.5 m, and in that it also comprises the use of additional material to cover the cavities between the U-shaped stiffening member (13), the I-shaped stiffening member (17) and the skin (11).

5. The process for manufacturing panels (9) for aeronautical structures with U-shaped stiffening members (13) and I-shaped stiffening members (17) between their webs according to claim 1, wherein the thickness of the U-shaped stiffening members (13) is less than 2.5 mm.

6. A process for manufacturing panels (9) for aeronautical structures with U-shaped stiffening members (13) and I-shaped stiffening members (17) between their webs according to claim 1, characterized in that the thickness of the U-shaped stiffening member (13) is equal to or greater than 2.5 mm, and in that it also comprises the use of additional material to cover the cavities between the U-shaped stiffening member (13), the I-shaped stiffening member (17) and the skin (11).

* * * * *